United States Patent

Tkachenko

[11] 3,993,155
[45] Nov. 23, 1976

[54] DOUBLE REDUCTION TANDEM AXLE DRIVING UNIT

[76] Inventor: Jury Alexandrovich Tkachenko, Zatonnaya ulitsa 8, korpus 1, kv. 43, Moscow, U.S.S.R.

[22] Filed: Mar. 3, 1975

[21] Appl. No.: 554,712

[30] Foreign Application Priority Data
Mar. 11, 1974 U.S.S.R. .............................. 2004247

[52] U.S. Cl. .............................. 180/88; 74/606 R; 180/24.11; 180/75
[51] Int. Cl.² ........................................ B60B 37/00
[58] Field of Search ................. 180/88, 75, 24.11; 74/606 R, 710

[56] References Cited
UNITED STATES PATENTS

| | | | |
|---|---|---|---|
| 1,730,900 | 10/1929 | Rockwell | 180/75 X |
| 1,906,613 | 5/1933 | Keese | 180/24.11 |
| 2,120,594 | 6/1938 | Alden | 180/24.11 |
| 2,570,191 | 10/1951 | Beckwith | 180/75 |
| 2,731,855 | 1/1956 | Schmal | 74/606 |

Primary Examiner—M. H. Wood, Jr.
Assistant Examiner—Terrance L. Siemens
Attorney, Agent, or Firm—Lackenbach, Lilling & Siegel

[57] ABSTRACT

This invention relates to a double reduction tandem axle driving unit comprising a housing with a plurality of walls and a flange to secure the housing to a drive axle's housing. The drive shaft is journalled in said housing and a bevel pinion is disposed on said drive shaft. A cross-shaft is journalled in the front and back walls of said housing at generally right angles to said drive shaft. A bevel gear is on said cross-shaft, and meshes with said bevel pinion of said drive shaft. A spur pinion is on said cross-shaft near said bevel gear and a spur gear is secured to a carrier of a differential mechanism for said drive axle. The spur gear meshes with said spur pinion and said flange is provided with an aperture for passing said bevel gear and said spur gear. A first bearing is disposed at the end of said cross-shaft where said bevel gear is located and a second bearing is disposed at the opposite end of said cross-shaft where said spur pinion is located. A partition inside said housing, passes between said drive shaft and said cross-shaft from said top wall to said flange, and said partition is provided with an aperture for permitting engagement of said bevel pinion with said bevel gear. The partition serves as the support for said first bearing. A support for said second bearing is in one of said side walls of said housing; whereby with such construction rigidity of the unit's housing is increased and assembly or disassembly of the double reduction unit is generally simplified, and whereby the unit's loading is diminished due to larger bevel gear sizes resulting in a generally longer service life for said unit.

Due to said construction, the rigidity of the housing is enhanced whereas the manufacture, assembly and disassembly double reduction unit are simplified. In addition, said construction permits an increase in the size of the meshing bevel gears.

4 Claims, 3 Drawing Figures

DOUBLE REDUCTION TANDEM AXLE DRIVING UNIT

The present invention relates to automotive vehicles, and more specifically relates to a double reduction tandem axle driving unit for automobiles. The double reduction unit embodied in accordance with the present invention can be used to advantage on multiple-axle trucks.

There is known a twin-stage tandem reducer for a drive axle of an automobile which includes a housing provided with a flange at the bottom for securing said housing to the housing of the drive axle. A drive shaft with a bevel gear is disposed in the housing. In this housing at right angles to the drive shaft there is provided a cross-shaft carrying a bevel gear which is in permanent mesh with the bevel gear of the drive shaft and also a spur gear in permanent mesh with a spur gear secured to the carrier, of the differential mechanism of the drive axle. A portion of said spur gear of the differential mechanism enters the housing of the reducer through a hole in the flange. This hole is of a size sufficiently large to enable the cross-shaft and its bearings to pass therethrough in the course of assembling the unit or reducer. One of said bearings is fitted to the cross-shaft between the bevel gear and the spur gear. The other bearing is fitted to the shaft at the spur gear end. A side wall of the housing serves as the support for said bearing whereas the support of the bearing disposed between the bevel gear and the spur gear is given the form of two semi-circular halves. While the upper part of said support is secured to the top wall of the housing, the lower part is bolted to the upper part of the support.

The support of the bearing disposed between the bevel gear and the spur gear made and arranged along the above lines not only impairs the rigidity of the reducer housing, but considerably renders difficult the process of manufacturing, assembling and disassembling the reducer.

Also widely known is a twin-stage tandem reducer for a drive axle of an automobile consisting of a housing having a drive shaft with a bevel gear and a cross-shaft which runs at right angles to the drive shaft and carries a bevel gear in permanent mesh with the bevel gear of the drive shaft along with a spur gear in permanent mesh with a spur gear secured to a carrier of the differential mechanism. The cross-shaft journalled in bearings, one bearing being disposed at the end of the shaft facing the spur gear and the other being between the bevel gear and the spur gear. A partition serves as the support for the latter bearing and it connects the top of the housing to its base. The cross-shaft is installed in the housing through an aperture provided in the side wall of the housing. The base of the housing has an opening through which a portion of the spur gear of the differential mechanism enters the housing of the reducer.

Such an aperture which is made in the side wall of the reducer impairs rigidity of the housing and invites difficulties experienced during the manufacture, assembly and disassembly of the reducer. The size of the aperture limits the size of the cross-shaft bevel gear which in turn obviously is a factor influencing the load-carrying capacity of the meshed bevel gears.

Examples of such prior art units or apparatus are disclosed in U.S. Pat. Nos. 1,906,613 and 2,731,855.

It is an object of the present invention to provide a double reduction tandem axle driving unit for a drive axle of an automotive vehicle where the cross-shaft and the supports of the cross-shaft bearings are of a layout which enhances the rigidity of the housing.

Another object of the present invention is to simplify the assembly and disassembly of the unit.

A further object of the present invention is to extend the service life of the bevel gears in mesh by a construction which permits increasing their size.

In accordance with these and other objects, there is disclosed a double reduction tandem axle driving unit for a drive axle of an automotive vehicle whose housing has a flange at the base for securing said housing to the drive axle housing and accommodates both a drive shaft with a bevel pinion and a cross-shaft disposed at right angles to said drive shaft. The cross-shaft is journalled in bearings which rest on supports contained in said housing, and it carries or supports a bevel gear in permanent mesh with the bevel pinion of the drive shaft and a spur gear in permanent mesh with a spur gear which is secured to a carrier of the differential mechanism of the drive axle so that a portion of said spur gear enters the housing of the double reduction unit through a hole in the flange of a size sufficiently large to enable the cross-shaft and gears accommodated thereon to pass therethrough in the course of assembling the unit. The bevel gear and the spur gear of the cross-shaft are secured, according to the invention, in close proximity one to the other and the bearings are disposed at the ends of said cross-shaft. The support for the bearing disposed at that end of the cross-shaft fitted with the bevel gear is a partition which is disposed inside the housing, connecting its top wall to the flange, and the partition passes between the drive shaft and the cross-shaft, and is pierced with an aperture in the locality where the bevel gears mesh each other.

The layout of the double reduction tandem axle driving unit embodied in accordance with the present invention allows extra rigidity to the housing compared with the known reducers; simplifies the fabrication, assembly and disassembly of the reducer; and permits bevel gears of a size larger than that of the bevel gears in the known reducers so that the unit load will be decreased and the service life consequently extended.

These and other advantages of a double reduction tandem axle driving unit for an automotive vehicle will be best understood from the following detailed description of a preferred embodiment of the present invention when this description is read in conjunction with the accompanying drawings in which FIG. 1 is a sectional view in elevation of the double reduction tandem unit according to the invention, showing the arrangement of components in a plane passing through the axis of the drive axle;

Figure 1:
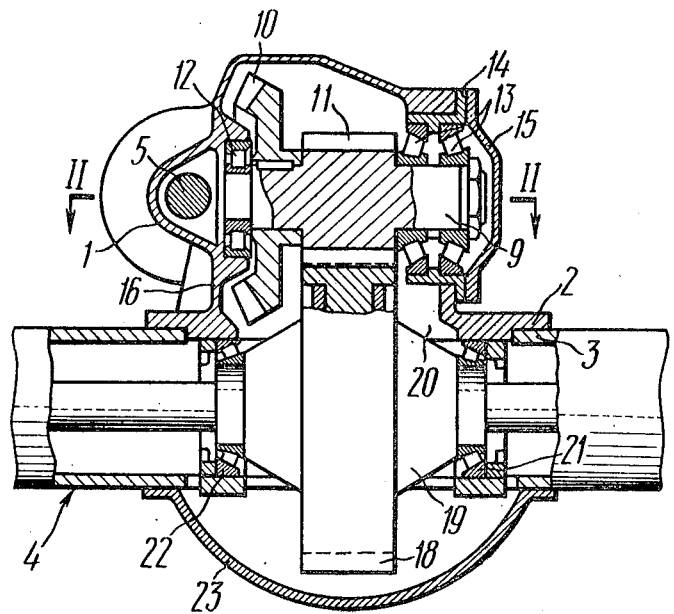
Figure 2:
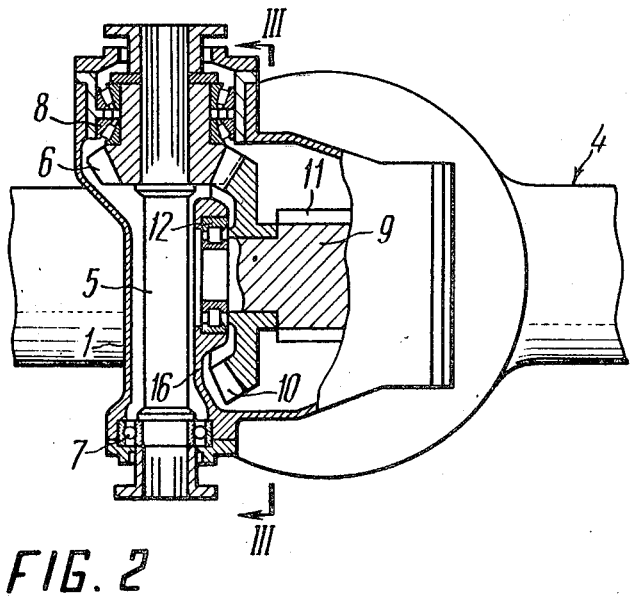
FIG. 2 is a sectional view along the line II—II of FIG. 1.

The double reduction tandem unit for a drive axle of the automobile consists of a housing 1, as best shown in FIGS. 1 and 2. The housing 1 is provided with a flange 2 at the base, said flange serving to secure the housing 1 to the housing 3 of a drive axle 4. The front and rear walls of the housing 1 are provided with two openings and disposed therein is a drive shaft 5 carrying a bevel pinion 6 (FIG. 2). The shaft 5 is supported in the housing 1 by bearings 7 and 8. Contained in the housing 1 at right angles to the drive shaft 5 is a cross-shaft 9. Fitted to said cross-shaft 9 by means of a key is a bevel gear 10 which is in permanent mesh with the bevel pinion 6 of the drive shaft 5. Fitted to the cross-shaft 9 in close proximity to the bevel gear 10 is a spur gear 11.

In the preferred embodiment of the present invention, the spur gear 11 is made integrally with the shaft 9. The cross-shaft 9 rests in bearings 12 and 13 disposed at its ends, one bearing shown at 12 being located on the side of the bevel gear 10 and the other bearing shown at 13, on the side of the spur gear 11. Serving as the support for the bearing 13 is a sleeve 14 accommodated in a hole in a side wall of the housing 1; said hole is closed by a cover plate 15. Preferably, made integrally with the housing 1 is a partition 16, connecting its top wall to the flange 2. Said partition passes between the drive shaft 5 and an end face of the cross-shaft 9, and serves as the support for the bearing 12.

Figure 3:
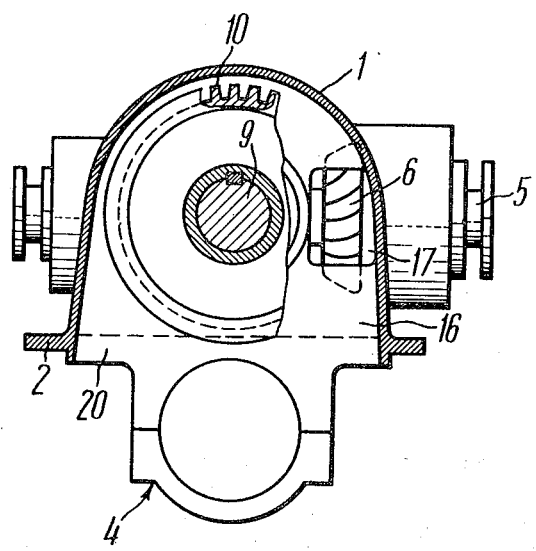
FIG. 3 is a section view along line III—III of FIG. 2.

The bevel gears 6 and 10 mesh each other through an aperture 17 (FIG. 3) of the partition 16, whereas said partition adds to the rigidity of the housing 1.

The spur gear 11 is in permanent mesh with a spur gear 18 secured to the housing 19 of the differential mechanism of the drive axle 4. The flange 2 of the reducer is provided with a hole 20 of a size sufficiently large to enable the cross-shaft 9 integrally with the bearings 12 and 13 as well as the gears 10 and 11 to pass therethrough. The spur gear 18 is disposed under the cross-shaft 9 and a portion of said gear enters the housing 1 through the hole 20. The carrier 19 of the differential mechanism is disposed inside the housing 3 of the drive axle by means of bearings 21 and 22. The housing 3 of the drive axle is closed at the bottom by a cover plate 23.

The fact that the driven bevel gear 10 is located between the bearings 12 and 13 of the cross-shaft and shares with the spur gears a common space enables an increase in the diameter of the driven bevel gear or, in other words, an increase in the size of the bevel gears without increasing the centre-to-centre distance of the spur gears. In case of necessity, i.e., when the reducer is fitted on the rearmost drive axle receiving the torque transmitted, the opening in the rear wall of the housing is closed with a cover plate (not shown).

The procedure of assembling the reducer is as follows. The cross-shaft 9 preassembled with the bevel gear 10, the bearing 12 and the inner race of one of the bearings 13 is inserted into the hole of the flange 2 of the housing 1 and thereafter is fitted the sleeve 14 with the outer races of the bearings 13. On fitting and securing to the shaft 9 the inner race of the other bearing, installed into the reducer are the drive shaft 5 integrally with the bevel pinion 6 and the bearings 7 and 8. Next, the bevel gears 6 and 10 are adjusted for correct meshing and then the spur gear 10 preassembled with the differential mechanism of the drive axle 4 is installed into the bearings 21 and 22.

The double reduction tandem axle driving unit embodied according to the present invention operates in the same way as the known twin-stage tandem reducers.

What is claimed is:

1. A double reduction tandem axle driving unit for an automotive vehicle comprising: a housing with a top wall, side walls, a front wall and a flange to secure the housing to a drive axle's housing, a drive shaft journalled in said housing; a bevel pinion on said drive shaft; a cross-shaft being journalled in said front and back walls of said housing at generally right angles to said drive shaft; a bevel gear on said cross-shaft, said bevel gear being in permanent mesh with said bevel pinion of said drive shaft; a spur pinion on said cross-shaft in close proximity to said bevel gear; a spur gear secured to a carrier of a differential mechanism for said drive axle, said spur gear being in permanent mesh with said spur pinion; said flange being provided with an aperture for passing said bevel gear and said spur gear; a first bearing disposed at the end of said cross-shaft where said bevel gear is located; a second bearing disposed at the opposite end of said cross-shaft where said spur pinion is located; a partition inside said housing, passes between said drive shaft and said cross-shaft from said top wall to said flange, said partition being provided with an aperture for permitting engagement of said bevel pinion with said bevel gear; said partition serving as the support for said first bearing; a support for said second bearing being in one of said side walls of said housing; whereby with such construction rigidity of the unit's housing is increased and assembly or disassembly of the double reduction unit is generally simplified, and whereby gear loading is diminished due to larger bevel gear sizes resulting in a generally longer service life for said unit.

2. The double reduction tandem axle driving unit according to claim 1, wherein said spur gear on said cross-shaft is integrally formed with said cross-shaft.

3. The double reduction tandem axle driving unit according to claim 1, wherein the driven bevel gear is located between the journalled bearings of said cross-shaft and between said spur pinion and one of said journalled bearings.

4. The double reduction tandem axle driving unit according to claim 1, wherein said partition is formed integrally with said housing.

* * * * *